(12) United States Patent
Hakunti et al.

(10) Patent No.: US 7,855,008 B2
(45) Date of Patent: Dec. 21, 2010

(54) BATTERY HOLDER

(75) Inventors: Jussi Hakunti, Turku (FI); Peter Knudssen, Copenhagen (DK); Tommi Teuri, Salo (FI)

(73) Assignee: Nokia Corporation, Espoo (FI)

( * ) Notice: Subject to any disclaimer, the term of this patent is extended or adjusted under 35 U.S.C. 154(b) by 1486 days.

(21) Appl. No.: 10/523,543

(22) PCT Filed: Aug. 28, 2002

(86) PCT No.: PCT/IB02/03473

§ 371 (c)(1),
(2), (4) Date: Sep. 22, 2005

(87) PCT Pub. No.: WO2004/021472

PCT Pub. Date: Mar. 11, 2004

(65) Prior Publication Data

US 2006/0147794 A1    Jul. 6, 2006

(51) Int. Cl.
*H01M 2/10*    (2006.01)
(52) U.S. Cl. ............... 429/100; 429/96; 429/97; 429/98
(58) Field of Classification Search .......... 429/100
See application file for complete search history.

(56) References Cited

U.S. PATENT DOCUMENTS 5,667,906 A    9/1997    Huang
5,733,674 A *  3/1998    Law et al. ............... 429/9
5,763,112 A *  6/1998    Redford ................. 429/1
6,117,575 A *  9/2000    Dinsdale ................ 429/1
6,120,932 A    9/2000    Slipy et al.
6,157,545 A * 12/2000    Janninck et al. ......... 361/814

FOREIGN PATENT DOCUMENTS

| EP | 0679002 | 10/1995 |
|---|---|---|
| EP | 0991246 | 4/2000 |
| JP | 11025941 | 1/1999 |
| JP | 01127456 | 5/2001 |
| WO | WO 0175988 | 10/2001 |

\* cited by examiner

*Primary Examiner*—Dah-Wei D Yuan
*Assistant Examiner*—Jacob Marks
(74) *Attorney, Agent, or Firm*—Alfred A. Fressola; Ware, Fressola, Van Der Sluys & Adolphson LLP

(57) ABSTRACT

The invention relates to a battery holder 30 for an electronic device. In order to provide an improved possibility of exchanging a battery of an electronic device, it is proposed that the battery holder 30 comprises an outer surface 31, means 32 for receiving an exchangeable battery 20 and means 33, 34 for connecting the battery holder 30 releasably to an electronic device. The latter means enable a connection of the battery holder to the electronic device in a way that electrical contact elements 21 of a battery 20 received by said battery holder 30 come into contact with electrical contact elements of the electronic device and that the outer surface 31 of the battery holder 30 forms part of the outer surface of the electronic device. The invention relates equally to a corresponding electronic device and to a cover for such an electronic device.

12 Claims, 2 Drawing Sheets

BATTERY HOLDER

CROSS REFERENCE TO RELATED APPLICATIONS

This application is for entry into the U.S. national phase under §371 for International Application No. PCT/IB02/003473 having an international filing date of Aug. 28, 2002, and from which priority is claimed under all applicable sections of Title 35 of the United States Code including, but not limited to, Sections 120, 363 and 365(c).

FIELD OF THE INVENTION

The invention relates to a battery holder for an electronic device. The invention relates equally to an electronic device and to a cover for an electronic device comprising such a battery holder.

BACKGROUND OF THE INVENTION

The power source required by electronic devices for their operation may be given in particular in the case of mobile electronic devices by a battery. Such a battery may have to be changed occasionally.

It is known to place the battery into a spacing provided in the electronic device and to close the spacing with a cover.

In U.S. Pat. No. 6,120,932, for example, it is proposed to employ a battery tray into which a battery cell is inserted. The tray is then fixed in a radio housing. A back cover finally slides over the radio housing to encapsulate the battery cells.

U.S. Pat. No. 5,667,906 presents a storage battery comprising a base housing and a cover housing, which form a receiving space for receiving an electric circuit board and a battery. The storage battery can then be inserted with the base housing as a leading side into a mounting room provided in a mobile phone to be electrically connected therewith.

It might be considered a disadvantage by some users that the cover covering a battery which was inserted into a spacing provided in an electronic device is often very light, whereby its handling resembles the handling of a toy. Moreover, such a cover is usually not particularly robust.

In an equally known alternative, the battery and the cover are realized as a permanently fixed unit. This approach has the disadvantage, however, that whenever the battery has to be exchanged, the customer has to buy a new entity comprising the battery and the cover, which is rather expensive.

SUMMARY OF THE INVENTION

It is an object of the invention to provide a improved possibility for exchanging a battery module of an electronic device.

This object is reached according to the invention with a battery holder for an electronic device comprising an outer surface, means for receiving at least one exchangeable battery at a side opposite to this outer surface and means for connecting the battery holder releasably to an electronic device. The latter means enable a connection of the battery holder to the electronic device in such a way that electrical contact elements of at least one battery received by the battery holder come into contact with electrical contact elements of the electronic device and that the outer surface of the battery holder forms part of the outer surface of the electronic device.

The object of the invention is equally reached with a cover for an electronic device, which cover comprises the proposed battery holder. The battery holder is connected to the cover by the proposed means for releasably connecting the battery holder to an electronic device. It is to be noted that the electrical connection between a battery received by the battery holder and the electronic device is only achieved when the cover has been connected to the electronic device.

Further, the object of the invention is reached with an electronic device comprising the proposed battery holder, wherein the battery holder is connected to the electronic device by the proposed means for releasably connecting the battery holder to an electronic device. The battery holder is preferably connected more specifically to a cover of the electronic device.

The invention proceeds from the idea that a part of the housing of an electronic device might be realized as a battery holder, to which a battery module may be connected in a releasable way.

The combination of battery module and battery holder can be connected to and removed from the electronic device comfortably as one integrated package. Still, the user of the electronic device can exchange the battery by itself without the battery holder when the battery life time has been reached. Thus, the user only has to buy a new battery, not a complete battery holder or cover comprising a battery module, whenever the battery module has to be exchanged.

It is further an advantage of the invention that the integration of the battery module and battery holder makes the removable part more robust compared to a cover by itself. At the same time, the battery holder protects the battery from mechanical stresses, especially when the mechanical construction of the battery module itself is thin and weak. Nowadays, batteries usually do not comprise rigid plastic parts at both ends any more. Instead, they are often only covered with an adhesive tape.

It is equally an advantage of the invention that it saves production costs, since the battery module is assembled by the user. The invention also facilitates logistics and thus allows an increase in battery production. Moreover, a standard battery can be used for the battery module, while design based product variants can be made by varying the surface of the battery holder.

Preferred embodiments of the invention become apparent from the dependent claims.

The at least one battery can be combined with the battery module in any suitable manner.

Preferably, a battery is connected to a battery holder by sliding the battery along guiding elements provided on the battery holder. The dimensions of the receiving space defined by the guiding elements should be such that it is suitably tight to hold the battery.

The battery holder may comprise in addition locking means, which may fix the battery to the battery holder and/or adjust the size of the receiving space of the battery holder to a variable battery size.

The battery holder can also be connected to the electronic device in any suitable manner.

Preferably, this connection is realized as a snapping connection. In order to ensure a secure connection, a button interacting with the snapping connection either on the side of the battery holder or on the side of the electronic device may be provided. A user of the electronic device may then release the snapping connection by pressing this button. Such a button is preferably connected to the cover of the electronic device, but can equally be provided on the battery holder.

The electronic device can be in particular a mobile phone, but equally it can be any other electronic device which is run with a battery.

BRIEF DESCRIPTION OF THE FIGURES

Other objects and features of the present invention will become apparent from the following detailed description considered in conjunction with the accompanying drawings, wherein.

DETAILED DESCRIPTION OF THE INVENTION

Figure 1:
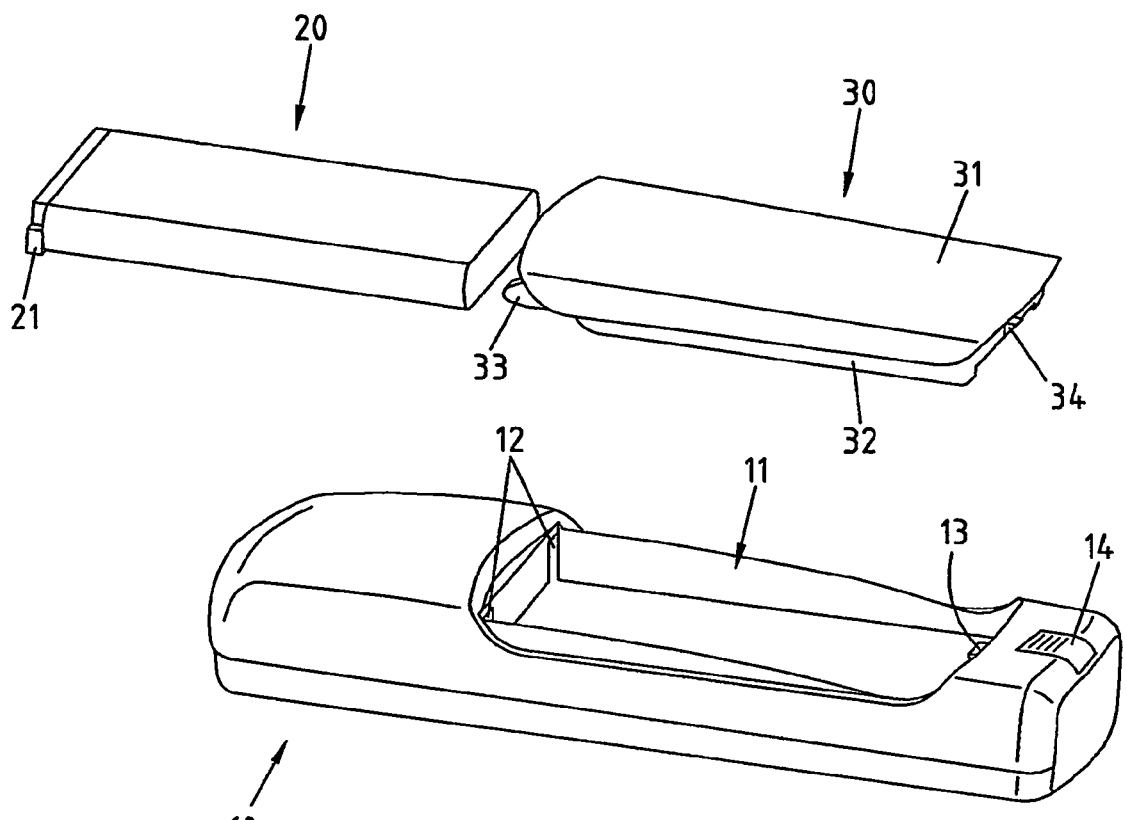
FIG. 1 to 4 illustrate steps in the assembly of a cover of an electronic device, of a battery module and of a battery holder according to an embodiment of the invention.

FIG. 1 presents a cover 10 forming part of an electronic device, a battery 20 and a battery holder 30, which are to be assembled. The electronic device, of which only cover 10 is shown, can be for example a mobile phone.

The battery module 20 is a standard battery module which comprises electrical contacts 21 at one end.

The battery holder 30 comprises a basically even surface 31 which has a length and width slightly larger than the length and width of the battery module 20.

At the opposite side, the battery holder comprises curved guiding elements 32 which are suited to receive the battery module 20 and to hold it in place. More specifically, the guiding elements 32 are suited to receive and guide the battery module 20 when it is slid lengthwise along the battery holder 30 at the side of the battery holder opposing the surface 31 of the battery holder 30. With the guiding elements 32, the battery holder 30 has a depth which is slightly larger than the depth of the battery module 20.

On both sides of one end of the battery holder 30, i.e. at one of its narrow sides, further a small projection 33 is provided, while at the other end, a part of a snapping connection 34 is provided. Additionally, locking means (not shown) may be provided for fixing the battery module 20 to the battery holder 30. Such locking means may consist for example in a tiny projection arranged between the small projections 33, which tiny projection extends along a middle part of the corresponding narrow side of the battery holder 30 opposite to its surface 31.

The electronic device to which the present cover 10 belongs comprises electronic components that are to be protected by the cover 10. The electronic components of the electronic device have to be powered by a battery module. To this end, the cover 10 comprises a receiving space 11, which is accessible through a cut-out in the cover 10. Length and width of the cut-out and of the receiving space 11 correspond to length and width of the battery holder 30. The depth of the receiving space 11 corresponds to the depth of the battery holder 30. In the situation presented in FIG. 1, the receiving space 11 is empty and open to the outside. When the cover 10 is connected to the electronic device, electrical contacts of the electronic device which are connected to the electronic components of the electronic device will be accessible via the receiving space 11 at one end of this receiving space 11, i.e. at one of its narrow sides. Further, a groove or an eye 12 is provided on both sides at the same end of the receiving space 11. At the opposite end of the receiving space 11, a part of a snapping connection 13 is provided, which is complementary to the part of the snapping connection 34 of the battery holder 30. The cover 10 of the electronic device moreover comprises a movable button 14, which interacts with the part of the snapping connection 13 of the cover 10.

Figure 2:
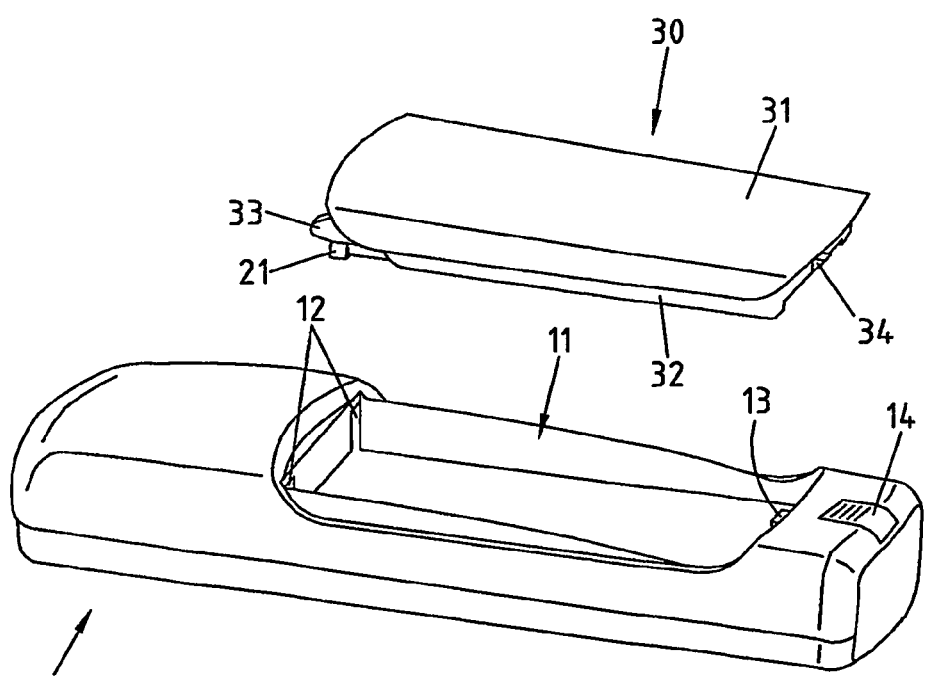

FIG. 2 illustrates the first step in the assembly of the cover 10, the battery 20 and the battery holder 30. The battery module 20 is received by the guiding elements 32 of the battery holder 30 and is guided in a sliding movement lengthwise the battery holder 30 to align completely with the battery holder 30. The battery module 20 is also held in place in this position by the guiding elements 32. As a result, basically only the electrical contacts 21 of the battery module 20 are still visible in FIG. 2. The battery module 20 is connected to the battery holder 30 with an orientation ensuring that the electrical contacts 21 of the battery module 20 are on the same side of the battery holder 30 as the small projections 33 of the battery holder 30.

Figure 3:
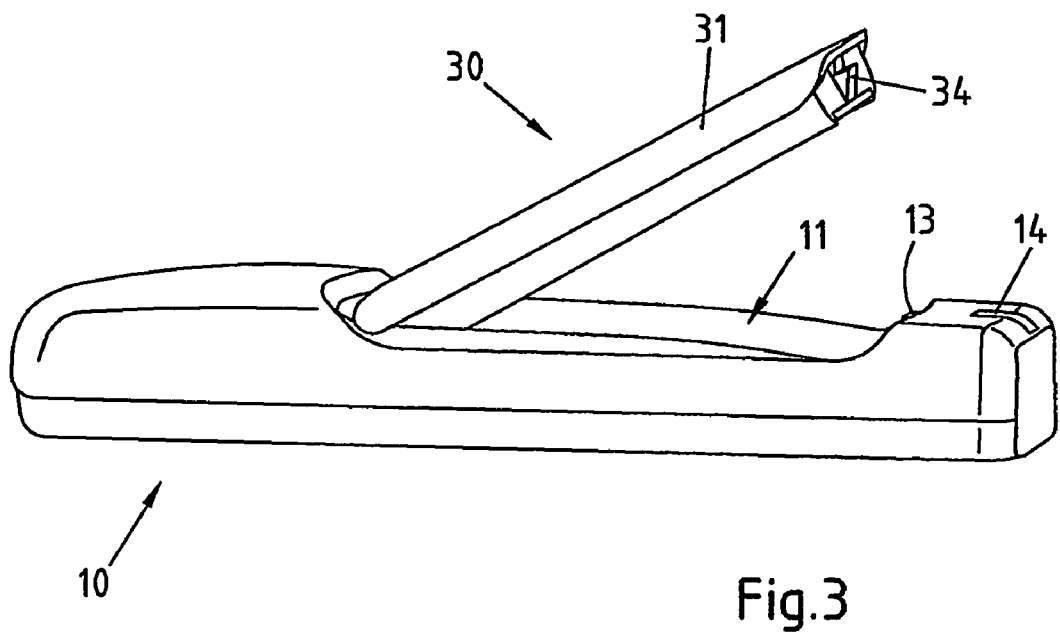

FIG. 3 now illustrates the assembly of the battery holder 30 comprising the battery module 20 with the cover 10 of the electronic device.

As can be seen in FIG. 3, the end of the battery holder 30 at which projection 33 is provided is inserted into the receiving space 11, namely at the end of the receiving space 11 which comprises grooves or eyes 12. The projections 33 of the battery holder 30 are thereby inserted into the corresponding grooves or eyes 12 of the cover 10 and the electrical contacts of the battery module 20 are brought into contact with the electrical contacts of the electronic device if or when the cover 10 is connected to the electronic device.

Then, the other end of the battery holder 30 is lowered, until the entire battery holder 30 is inserted completely into the receiving space 11 and until the complementary parts of the snapping connection 34, 13 of the battery holder 30 and the cover 10 interact and fix the battery holder 30 to the cover 10.

Figure 4:
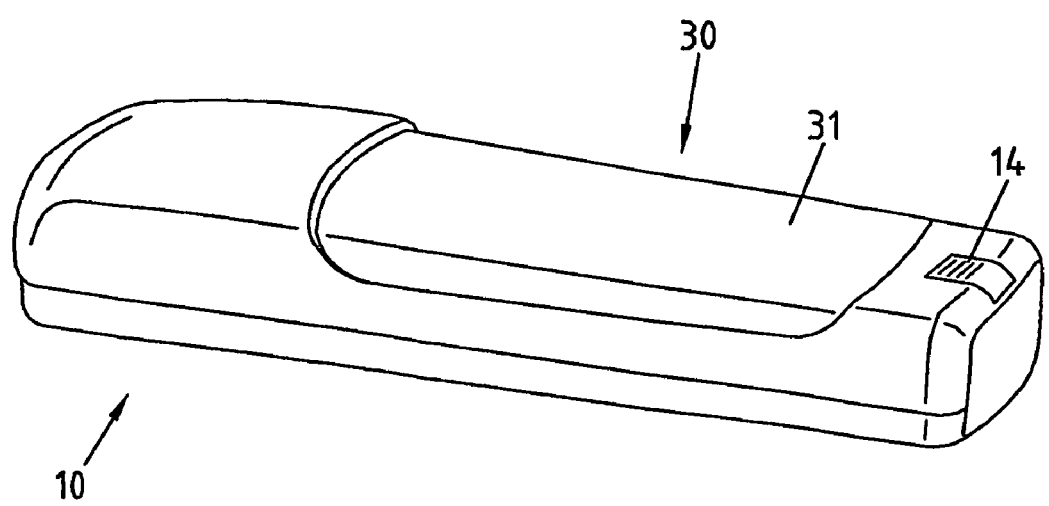

As a result, the cut-out of the cover 10 is completely filled in with the surface 31 of the battery holder 30, as can be seen in FIG. 4. The battery holder 30 thus forms part now of the cover 10 of the electronic device. For removing the battery holder 30 from the cover 10 again, a user has to move button 14 slightly away from the battery holder 30, for example with a fingernail. The allowed movement of the button 14 only has to be minimal. Thereupon, the snapping connection 13, 34 is released and the user can remove the battery holder 30 from the cover 10 in order to exchange the battery module 20, if required.

With the presented embodiment of the invention, the battery module can thus be exchanged easily by a user of the electronic device. It is on the one hand easy to connect the battery module with the battery holder, and on the other hand to connect the battery holder to the electronic device.

It is to be noted that the described embodiment constitutes only one of a variety of possible embodiments of the invention.

What is claimed is:

1. A battery holder for an electronic device comprising an outer surface, guiding elements configured to receive at least one exchangeable battery at a side opposite to said outer surface and a projection and a connection configured to connect said battery holder releasably to an electronic device such that electrical contact elements of at least one battery received by said battery holder come into contact with electrical contact elements of said electronic device and such that said outer surface of said battery holder forms part of the outer surface of said electronic device, wherein the guiding elements are configured to receive the at least one exchangeable battery when sliding the at least one exchangeable battery along the battery holder.

2. The battery holder according to claim 1, wherein said guiding elements are configured to enable a guided reception of at least one battery.

3. The battery holder according to claim 2 further comprising locking means for fixing at least one received battery to said battery holder.

4. The battery holder according to claim 3, wherein said projection comprises first connecting means for interacting with first connecting means of an electronic device and wherein said connection comprises second connecting means for interacting in a snapping manner with second connecting means of said electronic device when said first connecting means of said battery holder are interacting with said first connecting means of said electronic device.

5. A cover for an electronic device, which cover comprises a battery holder according to claim 1, wherein said battery holder is connected to said cover by said projection and connection.

6. The cover according to claim 5 comprising a button for releasing said battery holder from said cover, which button interacts with a connecting means of said electronic device and said connection configured to connect said battery holder to said cover.

7. An electronic device comprising a battery holder according to claim 4, wherein said battery holder is connected to said electronic device by said projection and said connection configured to releasably connecting said battery holder to an electronic device.

8. The electronic device according to claim 7 comprising a button for releasing said battery holder from said electronic device, which button interacts with said second means of said battery holder and said second connecting means of said electronic device connecting said battery holder to said electronic device.

9. The battery holder according to claim 1 further comprising locking means for fixing at least one received battery to said battery holder.

10. The battery holder according to claim 1, wherein said projection comprises first connecting means for interacting with first connecting means of an electronic device and wherein said connection comprises second connecting means for interacting in a snapping manner with second connecting means of said electronic device when said first connecting means of said battery holder are interacting with said first connecting means of said electronic device.

11. A battery holder for an electronic device comprising an outer surface, means for receiving at least one exchangeable battery at a side opposite to said outer surface and means for connecting said battery holder releasably to an electronic device such that electrical contact elements of at least one battery received by said battery holder come into contact with electrical contact elements of said electronic device and such that said outer surface of said battery holder forms part of the outer surface of said electronic device, wherein the means for receiving the at least one exchangeable battery are means for receiving the at least one exchangeable battery when sliding the at least one exchangeable battery along the battery holder.

12. The battery holder according to claim 1, wherein the guiding elements are configured to hold the at least one exchangeable battery in place.

* * * * *